Figure 1:
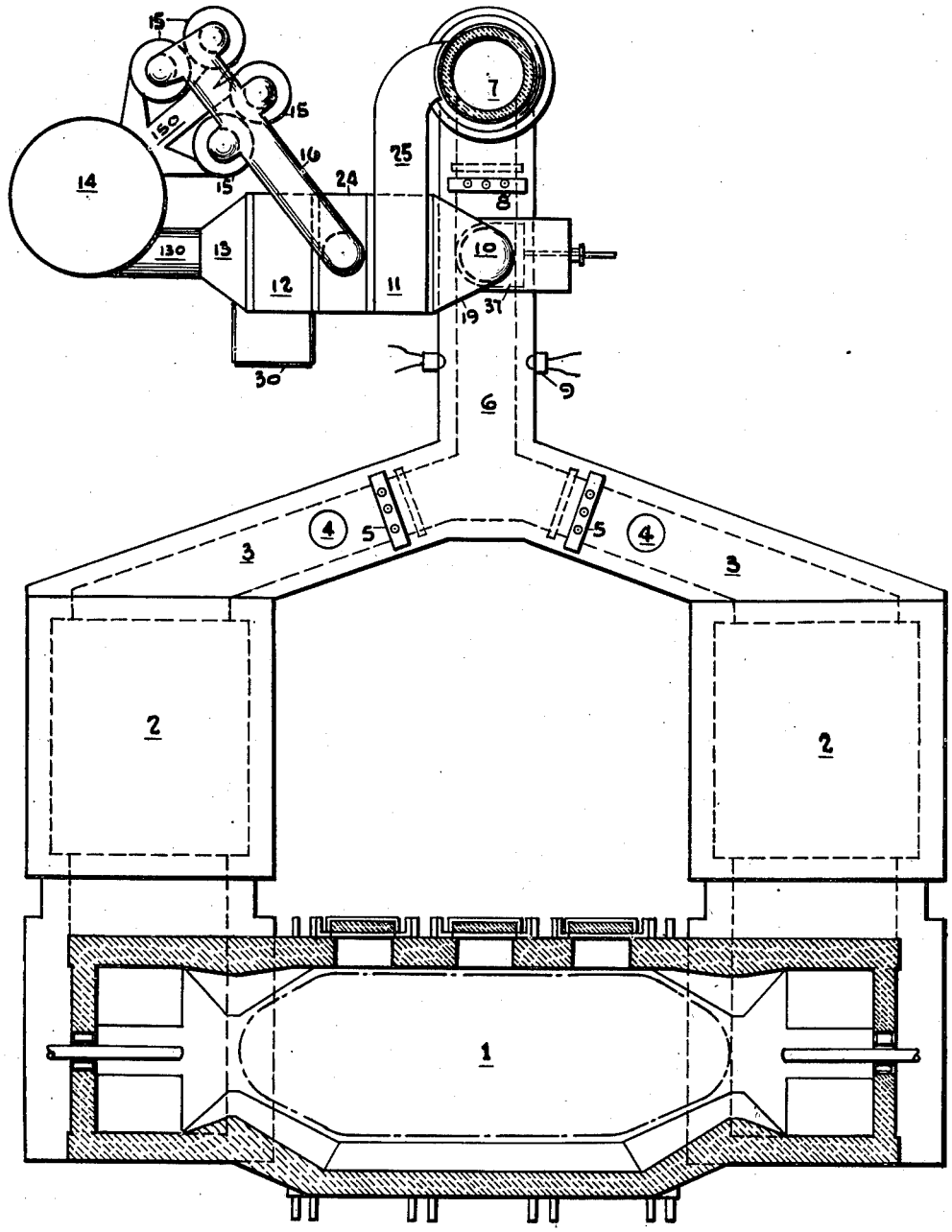

Sept. 2, 1952   C. B. FRANCIS   2,609,063
APPARATUS AND METHOD FOR CLEANING OPEN HEARTH STACK GASES
Filed June 2, 1950   3 Sheets-Sheet 1

INVENTOR.
Charles B. Francis
BY
Christy, Parmelee and Strickland
attorneys

Sept. 2, 1952  C. B. FRANCIS  2,609,063
APPARATUS AND METHOD FOR CLEANING OPEN HEARTH STACK GASES
Filed June 2, 1950  3 Sheets-Sheet 2
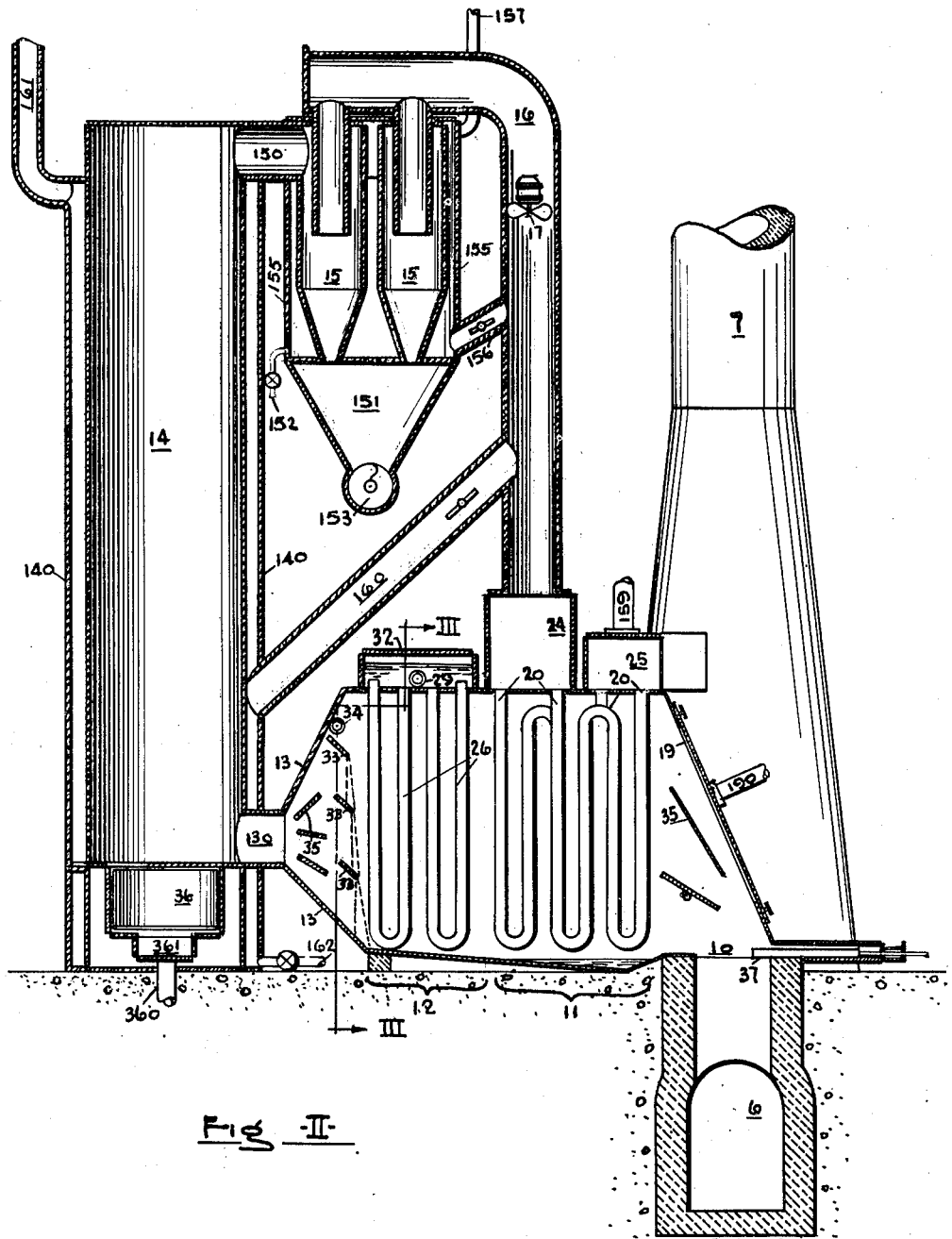
Fig. II
INVENTOR.
Charles B. Francis
BY
Christy, Parmelee and Strickland
attorneys Sept. 2, 1952  C. B. FRANCIS  2,609,063
APPARATUS AND METHOD FOR CLEANING OPEN HEARTH STACK GASES
Filed June 2, 1950  3 Sheets-Sheet 3
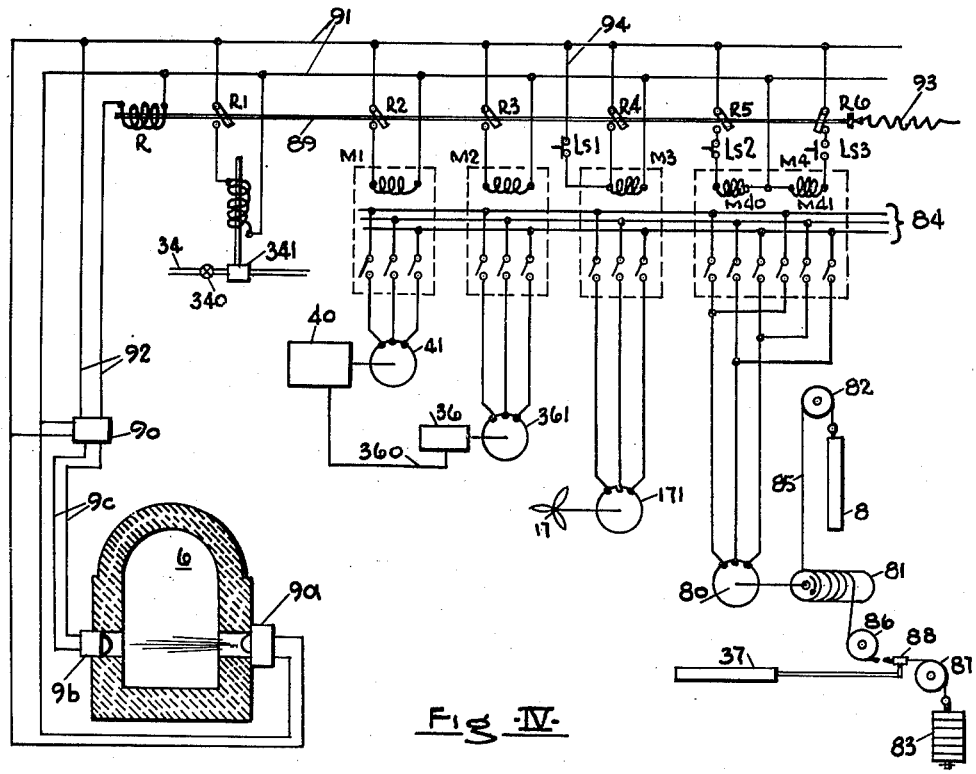
Fig. IV.
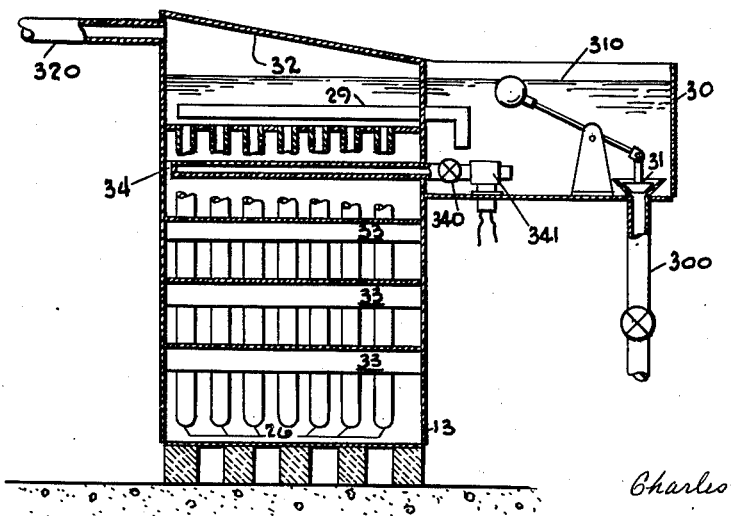
Fig. III.
INVENTOR.
Charles B. Francis
BY
Christy, Parmelee and Strickland
attorneys Patented Sept. 2, 1952

2,609,063

UNITED STATES PATENT OFFICE 2,609,063

APPARATUS AND METHOD FOR CLEANING OPEN HEARTH STACK GASES

Charles B. Francis, Pittsburgh, Pa., assignor to Loftus Engineering Corporation, a corporation of Maryland Application June 2, 1950, Serial No. 165,709

17 Claims. (Cl. 183—32)

This invention relates to the separation and recovery of very small dust particles from the gases of metallurgical furnaces. More particularly, the invention relates to the separation of the dust, or smoke particles, from the products of combustion of open hearth furnaces used in the production of steel.

The dust in the products of combustion of an open hearth furnace is not derived directly from the raw materials of the charge (which comprise iron ore, limestone, steel scrap and pig iron), but it is produced in consequence of the chemical and physical reactions that occur in the furnace, particularly during those periods in the process of making a "heat of steel," known as the ore and lime boils, and also during the subsequent intervals during which the heat is "worked."

The reactions take place in the bath itself, with the simultaneous formation of slag and gases, the gases comprising mainly carbon monoxide. The gases rise rapidly to the surface of the bath and carry particles of slag into the streaming flames and products of combustion above the surface of the bath. During the "working" period oxygen may be introduced into the bath through small steel tubes known as lances, for the purpose of reducing the percentage of carbon and raising the temperature of the bath of molten metal. The temperature at the tip of the oxygen lance is extremely high, so that some manganese, iron and other metals may be volatilized and rise out of the bath in the form of vapors. These vapors entering the furnace streaming atmosphere above the bath are oxidized, forming oxide particles of molecular size. In addition, part of the metallic oxides formed at the tip of the lance are entrained by the carbon monoxide formed at the time, and are carried into the furnace atmosphere in the form of very small particles.

With the exception of those periods of furnace operation mentioned above, there is little or no tendency for the furnace to produce dust or vapors to objectionable degree. That is to say, during the charging of the furnace, and melting down of the scrap and additions, and the tapping of slag or metal, little or no dust is carried out of the furnace. Thus, the weight, size, and composition of the solid particles projected into the furnace chamber above the bath vary widely. The variation in the weight of dust produced may range from one lb. to thirty lbs. per minute, while the variation in the size and composition may run from relatively large to very small particles of slag, and extremely fine particles of metallic oxides, which make up the fine dusts generally referred to as aerosols.

The modern open hearth furnace, with its two or four checker chambers and system of flues, is itself a dust collector. That is to say, the larger particles of slag are caught in the slag pockets provided at the bottoms of the downtake flues of the furnace, while the smaller particles of slag and the larger particles of metallic oxides are deposited in the checker chambers and in the system of flues leading to the stack, which may or may not include a waste heat boiler. In general, therefore, the dust content of the waste gases at the base of the stack may vary from a small fraction of a grain to about 4 grains per cu. ft., and the temperature of such gases may range from about 600° F. to 1350° F.

An object of the present invention is to minimize the cost of cleaning the waste gases of metallurgical furnaces, and in the case of open hearth furnaces the object is to clean the gases only during those intervals in furnace operation when cleaning is necessary to reduce the aerosols escaping to at least the allowable limit of about 0.2 grain per cu. ft. (at standard atmospheric conditions of 60° F. and 30 inches of mercury), it being understood that it is the aerosols which form the visible dust, or smoke, as the gases enter the open atmosphere from the top of the furnace stack.

As control of the aerosols within these limits cannot be effected by ordinary methods of test, and visual methods are impossible at dawn, dusk and night, or more than 50% of the time a furnace is operating, another object of the present invention is to provide means whereby the dust content of the gases escaping to the air may be automatically held to the allowable limit or below the limit.

The particles of dust occasionally found at the base of open hearth stacks vary in size from submicroscopic particles of less than 0.1 micron in diameter to particles as large as 300 microns. Of this dust slightly more than 50% is at times made up of particles less than 5 microns in size, and about 60% of this extremely finely divided particulate matter is less than 0.5 micron in size. While part of the latter will settle in still air, the rest normally remains suspended in the air until precipitated by natural phenomena such as fogs and electrical storms. Nevertheless, these small particles below 0.5 micron in size are in the "smoke" range, and when present in sufficient quantity form a visible smoke at the top of the stack. Only a few of the more common methods of cleaning gases will remove this smoke, and substantially all of the known methods present certain drawbacks or difficulties, which heretofore have made cleansing of stack gases either very costly or impracticable, particularly in the case of metallurgical furnace gases.

Another object of the invention is to remove smoke-forming particles from stack gases, and to overcome the drawbacks and difficulties hitherto encountered.

The obnoxious or harmful fumes given off by open hearth furnaces may consist of the oxides of sulfur and silicon fluoride (which are formed in the furnace), plus volatile metals and their oxides, such as the zinc and lead included with the furnace charge. In the waste gases both zinc and lead are found in the form of finely divided oxides. With practically sulfur-free fuels, such as coal tar and natural gas, the oxides of sulfur given off slowly by the slag formed shortly after the charge has been melted are limited to about 100 lbs. per 250 tons of steel produced. Discharged in such small amounts, these gases are harmless to plant and animal life. With higher sulfur fuels, such as coke oven gas, producer gas, and fuel oils, the oxides of sulfur are given off continuously during the steel-making process, and the amount discharged to the air from a 250-ton oil fired open hearth may exceed 1500 lbs. per heat. Discharged in this amount from each of several furnaces in a steel plant, these gases may become detrimental to vegetable life, and may produce a corrosive atmosphere in the vicinity of the plant.

The reduction of the quantity of these harmful fumes in the gases discharged by an open hearth furnace, or the like, form still another object of the present invention.

Other objects of the invention will be apparent in the following specification, and in the accompanying drawings that illustrate a preferred embodiment of apparatus, in which and in the operation of which the invention is realized. In the drawings:

Fig. I is a plan view showing my gas-cleaning apparatus connected to an open hearth furnace, the furnace with its flues and stack being indicated diagrammatically;

Fig. II is a diagrammatic view of the apparatus in vertical section;

Fig. III is a fragmentary view of the apparatus in vertical section, as seen on the plane III—III of Fig. II; and Fig. IV is a wiring diagram.

Referring to the drawings, reference numeral 1 indicates an open hearth furnace, with which the apparatus of this invention is organized, and 2, 2 indicate the checker chambers of the furnace, from which the fantails and flues 3, 3 extend to a flue 6 leading to the furnace stack 7. The air valves of the furnace are diagrammatically indicated at 4, 4, and the reversing valves or dampers at 5, 5. The reference numeral 8 indicates the stack damper in the flue 6. A port 10, controlled by a damper 37, opens from the flue 6 into a housing 19 that forms the inlet to the gas-cleaning apparatus of this invention.

During those periods of furnace operation when the gases are clean, the stack damper 8 is open and the damper 37 is closed, and the gases flow from the flue 6 directly into the stack 7, whence they are discharged from the top of the stack into the open atmosphere. On the other hand, during those periods of furnace operation when the gases are objectionably fouled with dust and vapors, the damper 37 is open and the damper 8 is closed, with the effect that the gases are by-passed from the flue 6 through my dust-removing apparatus. The opening and closing of these dampers is controlled by means of a photoelectric unit 9 mounted in the flue 6, and, as will presently appear, the dust-cleaning apparatus is brought into play and functions only during those periods of furnace operation in which the cleansing of the gases is required. Substantial savings in operating costs are thus realized.

The gas-cleaning apparatus of the invention includes two chambers 11 and 12 which stand in open communication with one another. The fantail or spreader housing 19 distributes the flow of gases from flue 6 across the mouth of the chamber 11. The chambers 11 and 12 each include a set of metal heat-exchange tubes, 20 and 26, respectively, through which cooling media flow. Across the top of fantail 13 a pipe 34 extends. This pipe is perforated at spaced points in its extent, and from the perforations water drips downwardly upon a vertical series of splash plates 33. The hot gases flowing from the flue 6 through the chambers 11, 12 and fantail 13 enter an agglomerator 14 by way of a tangential connecting duct 130, and in the course of such flow the gases are cooled and humidified by means of the heat-exchange tubes 20 and 26 and the water introduced by pipe 34. The temperature of the gases is reduced to 200° F., or below.

In the agglomerator 14 the fine particles of dust are flocculated or assembled into particles of larger size, particles that may be readily separated from the gases by means of apparatus offering little resistance to the gas flow, such as turbo separators, or cyclone separators. In this case I employ four cyclone separator units 15. The gases containing the agglomerated dust particles enter the units 15 tangentially, by way of ducts 150 leading from the top of the agglomerator, and in known way the agglomerated dust particles are centrifugally removed from the flowing gases and deposited in a hopper 151 (Fig. 2), while the clean gases emerge from the cyclone units into the duct 16, wherein they are propelled by a fan 17 to a header 24. The agglomerated dust may be removed from hopper 151 by means of a screw conveyor 153, and discharged into a railroad car or other vehicle for transportation to a sintering plant, or other desired point of disposal. The operation of agglomeration will be described in detail later in this specification, but at this point it may be noted that the operation of my apparatus, as distinguished from prior dust-cleaning apparatus, eliminates the problem of dust disposal, since the agglomerated particles maintain their integrity to the extent necessary for handling.

From the header 24 the clean, cool gases stream through heat-exchange tubes 20 into a header 25, whence the gases flow into the stack 7 of the furnace. A feature of the invention resides in such use of the cool, clean gases as a cooling medium for the hot dirty gases flowing from the flue 6 into the dust-removing apparatus. Not only does such procedure provide for the essential cooling of the dirty gases, but the clean gases are heated prior to their entrance into the stack, thereby providing augmented natural draft in the stack which assists the fan 17 in propelling the gases through the system. Power costs for operating the apparatus are held to a minimum. The heating of the clean gases provides another advantage. It insures that the gases delivered from the top of the stack are at such temperature that the entrained water vapor will not condense either within or at the top of the stack and provide a fog or mist, having the appearance of smoke.

The foregoing presents the general nature of apparatus in which my invention may be practiced, and consideration will now be given to certain detailed principles of operation and details of construction.

The heat-exchange tubes 20 are welded at their respective ends to the floor plates of header chambers 24 and 25, after the fashion that boiler tubes are welded to the header plates of a boiler. As thus secured to said floor plates the tubes 20 are suspended with the bends at their lower ends spaced about 1½ inches above the floor of chamber 11, whereby free expansion and contraction of the tubes are permitted without unduly stressing any of the structure. The relatively cool, clean gases delivered by the fan 17 are caused to flow through the tubes 20, and through the walls of such tubes absorb heat from the dirty gases passing from flue 6 to the agglomerator 14.

The second battery of heat-exchange tubes— the tubes 26 in chamber 12—are cooled by a different medium from that employed in tubes 20. More particularly, water is circulated through the tubes 26, whereby the dust-laden gases passing between the tubes 20 are subjected to a second stage of cooling. The U-shaped tubes 26 are welded at their ends to the floor of a water and steam chest 32, into which water is delivered by a pipe 29 fed from a supply tank 30, Fig. 3. Water is furnished to tank 30 by way of a supply pipe 300, and a float valve 31 controls the flow of water from the supply pipe, to maintain the water at a predetermined level 310, at which level the water in chest 32 is also maintained. It will be perceived that one leg of each of the U-shaped tubes 26 is longer than the other, whereby it projects at a higher elevation slightly above or below the surface of water in the chest 30. In consequence a continuous circulation of water may be maintained in the tubes 26. By adjusting the float-valve the water level may be lowered below the top of the longer legs of the U-tubes, whereupon water will flow into the shorter legs only as rapidly as the water in the longer legs is converted into steam. This condition is preferable in those cases in which the gases enter the chamber 12 at a temperature somewhat above 212° F. An outlet 320 opens from chest 32 above water level, for the escape of any steam that develops when the apparatus is in service.

As the dust-laden flue gases leave chamber 12 they flow through the rain created by the water dripping from pipe 34 and splashing on plates 33. While the gases leaving chamber 12 have been cooled several hundred degrees from the temperature at which they leave the flue 6, they are still above 200° F. as they reach the humidifying zone in fantail chamber 13. At such temperature the gases vaporize the water droplets and entrain the vapor. This vaporization of the water is accompanied by the absorption of substantial quantities of heat from the gases, with the effect that the temperature of the gases is reduced to 200° F., or below. Thus, it will be understood that in flowing through the fantail chamber 13 into the agglomerator 14, the gases are subjected to a third stage of cooling, as well as to himidification. Such water as is not vaporized in its descent from the pipe 34 is collected in the pan-shaped floor common to the chambers 11 and 12, where it is evaporated by the gases flowing through such chambers. The flow of water is regulated to requirements by means of a valve 340 in the pipe 34, and an electro-magnetic shut-off valve 341 for starting and stopping the flow of water, is provided, as will appear later.

It will be noted that baffles 35 are provided in the fantails 19 and 13 leading to and from the heat-exchange chambers 11 and 12, respectively. These baffles are in reality direction vanes that are positioned to provide the desired distributed flow of gases through the nests of tubes 20 and 26 and through the water raining from pipe 34 and splashing on plates 33.

The agglomerator or sonic chamber 14 consists of a vessel—in this case a cylindrical metal tank to which the reference numeral 14 is immediately applied. Organized with the tank is a sound generator 36 located in this instance, at the bottom of the tank. While the sound generator may be constructed in various forms, I preferably employ an electrically driven siren type generator or modulator of sound waves, used with compressed air admitted through a pipe 360. As an example of a form of sound generator or modulator which may be used, reference is made to the device disclosed in Letters Patent No. 2,424,375, granted July 22, 1947, to W. A. Van Allen.

As the gases ladened with dust and vapor enter and flow upwardly through the acoustic vessel 14, they are subjected to sonic vibration, and the small particles of dust, also droplets of liquids, if present, are made to move at rates and directions differing from those of the fixed gases, whereby the particles and droplets remaining in suspension in the gases are caused to collide with each other by the forces of attraction and repulsion thus generated. Once the particles make contact they adhere to each other, being held together by the force of gravitation or mass attraction, which, for very small particles, say less than 1 micron in any dimension, is very small. For this reason, the agglomeration or flocculation may tend to be temporary, and the particles may tend to disperse after they pass out of the acoustic chamber. This tendency is neutralized and the flocculation is made practically permanent by the introduction of the fine droplets of a liquid, which is advantageously accomplished by "fogging," as will appear later herein.

The cleaning efficiency of the agglomerator is also dependent upon the intensity and frequency of the sound waves generated, the time of exposure of the aerosols to vibration, the density, size and number of the dust particles per unit volume of the gases, and the temperature of the gases. While agglomeration is possible at any temperature at which the gas-borne bodies remain in the liquid or solid phase, low temperatures are preferable, because the volume of the gases is less and the dust density is greater. Furthermore, the required equipment may be smaller and less expensive when treating a given weight of gases at lower than at higher temperatures.

Uniformity of temperature is very desirable since the velocity of sound varies at different temperatures, and any variation in the temperature of the gases affects the time required for the gases to pass through the resonant chamber, other things being equal. In the present invention, the temperature of the gases as they flow into the resonant chamber is adjusted to a point near 200° F., although the temperature of the flue gases may vary from 600° F. to 1350° F. The velocity of the gases flowing through the resonant chamber is also kept substantially constant by the fan 17. When only air is used for the combustion of a given fuel in the furnace the volume of gases generated in the furnace is fairly constant, but is much less when the air is enriched with oxygen. If in consequence of using oxygen from time to time, or for other reasons, there are fluctuations in the volume or temperature of the gases, I make provision for such variations in operating conditions as are thereby occasioned. Specifically, I build the resonant chamber large enough to function properly with the fan driven at normal speed when air alone is used for combustion. Then, when the air is enriched with oxygen the speed of the fan is reduced accordingly, and one or two of the cyclones is shut down to maintain the velocity of the gases flowing through the remaining cyclones at an effective rate. As previously mentioned, the content of smoke-forming dust in the gases to be cleaned is relatively low, and this normally requires a long period of exposure to the sonic effects produced in the acoustic chamber 14 in order to obtain the desired agglomeration of the dust particles. As the diameter of the acoustic chamber is limited to eight or nine feet, for reasons with which this invention is not immediately concerned, the required time of exposure of the gases has been heretofore obtained by increasing the height of the chamber, which in the cleaning of open hearth furnace gases would require a chamber of excessive height. In accordance with the present invention, however, the necessity for using an objectionably high chamber is overcome, and the integrity of the flocculated particles increased, by creating a fog in the gases as they enter the resonant chamber. To insure that the fog droplets shall be as small as possible; that is, less than 1 micron in diameter, so as to approach the size of the dust particles, the fog is produced by introducing a small but fixed amount of water into the hot gases, cooling the gases to a temperature but slightly above the saturation point, and introducing the gases to the resonant chamber 14 in such a way that the relatively cold air from the siren is rapidly mixed with them, thereby condensing a portion of the water vapor to form fog.

Assuming that the air delivered by the pneumatic siren 36 has a volume equal to 20% of that of the gases and is at a temperature of 70° F., the cooling effect of this air is sufficient to lower the temperature of the dry gases approximately 30° F. With water present in the sufficient quantities I provide, however, the effect is to lower the temperature of the gases to the saturation point at which water can co-exist in both the liquid and vapor phases, and then to condense into fog such portion of the entrained water vapor as will raise the temperature of the air to said saturation point. In addition to the fog thus produced, the dust particles themselves, if they also have a temperature no higher than that of the gases, form nuclei about which the fog particles form. As the gases entering the acoustic chamber 14 are thus loaded with fog particles mixed with the dust particles, the agglomeration or flocculation is effected in a relatively short time, and a certain dampness is imparted to the agglomerated dust particles, resulting in the dust being easier to remove from the cyclones, and easier to handle without danger of air pollution.

The acoustic chamber 14 is insulated in order to prevent its walls from cooling, particularly in the winter season, to the degree at which there will be an objectionable precipitation or condensation of moisture from the gases flowing through the chamber, it being noted that such condensation of moisture will result in the coagulation and accumulation of dust particles upon such walls. For the same reason, it is desirable to insulate the external walls of the cyclone units 15. The insulation of the walls of the acoustic chamber 14 performs a second function; that is, the insulation serves as an absorber of sound waves, thereby deadening the noise of the siren 36 which would otherwise prove objectionable to persons working in the vicinity of the apparatus.

In lieu of the insulation referred to, or in combination therewith, the walls of the acoustic chamber may be enveloped within a spaced outer wall 140, and into the space between the inner and outer walls of the chamber the clean air propelled by fan 17 is admitted through a by-pass duct 160, and ejected through an outlet 161 into the open atmosphere. A continuous flow of the clean gases at superatmospheric temperature is thus established and maintained in the space between the inner and outer walls of the acoustic chamber, thus insuring that the temperature of the inner walls, with which the gases flowing through the chamber make contact, are held at a temperature above that at which an objectionable precipitation of moisture will occur. A drain 162 is provided at the bottom of the acoustic chamber, to permit the removal of such condensate as may be produced between the inner and outer walls.

In like manner the walls of the cyclone units 15 may be enclosed within an outer wall, as indicated at 155 in Fig. 2. The relatively warm, clean air in the duct 16 is by-passed into the space between the wall 155 and the enclosed cyclone units 15, by way of a by-pass duct 156, and the escape of the gases from such space is obtained through an outlet or stack 157. A condensate drain 152 is provided, as shown.

In some installations it may be desirable that the temperature of the gases used to heat the walls of the acoustic chamber and cyclone units shall be at a higher temperature than that of the gases delivered by fan 17 to the inlet header 24 of the heat exchange tubes 20. The desired hotter gases may be obtained from the outlet header 25 of the heat exchange tubes, and as shown in Fig. 2 a duct 159 may be connected to the inlets of the heating spaces between the inner and outer walls of the acoustic chamber and cyclone units.

In the foregoing specification, mention is made of a photo-electric unit 9, which automatically controls the operation of the apparatus. An understanding of the structure and operation of such unit may be had upon consideration of the diagram shown in Fig. 4.

The flue 6 is shown in cross-section, and in one of the side walls of the flue a light source 9a is arranged to project a light beam upon a photo-electric cell 9b in the opposite side wall of the flue. The structure and mode of operation of photo-electric apparatus of this sort are well known in the electrical art, wherefore this specification need not be prolonged with a detailed description of the same. Suffice it to say that the photo-electric apparatus is arranged to develop or modify a weak electric current in circuit 9c, which is strengthened by means of an amplifier 90 connected to single-phase power supply lines 91.

In many installations the compressed air for use with the sonic generator 36 may be drawn from the normal supply of compressed air available in the plant in which the gas-cleaning apparatus is provided. However, in the event that a suitable supply of compressed air is unavailable in the plant, a compressor 40 is provided, driven by an electric motor 41, as diagrammatically shown in Fig. 4. The motor 361 for the sonic generator 36, the motor 171 for the fan 17, and a motor 80 for operating the dampers 8 and 37 also appear diagrammatically in Fig. 4. The four electric motors are respectively controlled by magnetic switches M1, M2, M3 and M4. The coils of the magnetic switches are connected to the single phase power supply lines 91, as is the coil of the magnetic shut-off valve 341 located in the pipe 34 that delivers the rain to the humidifying chamber 13.

The energizing circuit of the actuating coil of shut-off valve 341 includes a switch arm R1, and the energizing circuits of the coils of magnetic switches M1, M2 and M3 of the air compressor motor 41, sonic generator motor 361, and fan motor 171 include switch arms R2, R3 and R4, respectively. The motor 80, which operates the dampers 8 and 37, is a reversible motor, connected to drive winch drum 81, upon which a cable 85 is wound. One end of the cable extends over a pulley 82 and is connected to stack damper 8, while the opposite end of the cable is trained over pulleys 86 and 87, and connected to a counterweight 83. The stem of the damper 37 is connected to the cable, as at 88. When the motor 80 rotates the drum 81 clockwise, as shown in Fig. 4, the upwardly extending end of the cable is paid out, and the stack damper 8 is moved downwardly into closed position in the flue 6, while the downwardly extending end of the cable is also paid out under the effect of weight 83, causing the movement of the damper 37 into open position, to establish the flow of gases from flue 6 into the gas-cleaning apparatus. Manifestly, the operation of motor 80 to drive the drum 81 in opposite direction effects the closing of the damper 37, and the opening of damper 8.

In order to provide for the operation of the motor 80 in either of opposite directions of rotation, the magnetic switch M4 includes two sets of contactors and two energizing coils M40 and M41. The energizing circuit of coil M40 includes a switch arm R5 and a limit switch LS2, which switch is arranged in the path of travel of the stack damper 8 and is adapted to be opened by such damper when it reaches closed position. The energizing coil M41 includes a switch arm R6 and a limit switch LS3, arranged to be opened by the movement of stack damper 8 into open position, said limit switch remaining in open position as long as the stack damper remains open. The switch arms R1 to R6, inclusive, are connected in common to the actuating bar 89 of a relay whose coil R, when energized by an amplifier circuit 92, overpowers a compression spring 93 to maintain the switches R1 to R6 in the positions in which they are illustrated in Fig. 4, all of the said switch arms standing in open or circuit-interrupted positions, with the exception of switch arm R6. The switch arm R6 stands in circuit-closing position, but the limit switch LS3 in series therewith stands in open position, by virtue of the fact that stack damper 8 is at the time supported in open position and the damper 37 in closed position. With the dampers so positioned the gases flow from the furnace directly to the stack 7, it being understood that the furnace gases are clean, whereby the intensity of the light beam directed on photo-electric cell 9b produces in circuit 9c a current of sufficient magnitude, as amplified by unit 90 and delivered to circuit 92, to energize the coil R1 and dominate the force of spring 93, so that the switches are held in the positions in which they are illustrated in Fig. 4, with all the motors 41, 361, 171 and 80 at rest, and with the electro-magnetic valve 341 closed, shutting off the flow of water to the humidifier 13.

The gas-cleaning apparatus remains idle as long as the gases delivered by the furnace are clean. When the gases become smoky and ladened with dust, the intensity of the light beam playing on the photo-electric cell 9b is reduced, thereby reducing the current in circuit 92 and permitting the spring 93 to overcome the electromagnetic force of coil R and shift the relay bar 89 in right-to-left direction, closing switch arms R1 to R5 inclusive, while simultaneously moving switch arm R6 into circuit-interruption position. Thus, the valve 341 is opened and the flow of water to the humidifier 13 is initiated; magnetic switch M1 closes and energizes the air-compressor motor 41; magnetic switch M2 closes and energizes the motor 361 of the sonic generator; magnetic switch M3 closes and energizes the motor 171 of the fan; and coil M40 of magnetic switch M4 is energized and closes the circuit which sets the motor 80 in rotation to drive the drum 81 clockwise, thereby initiating the movement of stack damper 8 into closed position, and the movement of damper 37 into open position. As the damper 8 reaches fully closed position it opens limit switch LS2, de-energizing coil M40 and interrupting the energizing circuit of motor 80. The movement of the damper 8 from open position permits the limit switch LS3 to close, whereby the circuit of coil M41 may be completed upon the reclosing of switch arm R6.

It will be perceived from the foregoing description that the gas-cleaning apparatus is brought into operation automatically when the furnace gases become smoky and contain objectionable quantities of dust and vapors. The gas-cleaning apparatus remains in operation as long as the furnace gases require cleansing.

When the furnace enters a period of operation in which the waste gases become clear the light intensity effective on photo-electric eye 9 results in the increase of the current in circuit 92 to such value that the thrust of the coil R on bar 89 overcomes the stress of spring 92 and thereby restores the switch arms R1 to R6, inclusive, to the positions in which they are illustrated in Fig. 4. Thereupon, the valve 341 closes; the motor 41 of the air compressor 40 is de-energized; the motor 361 of the sonic generator is de-energized; and the coil M41 of magnetic switch M4 closes the energizing circuit of motor 80 to rotate such motor and the drum 81 counter-clockwise. Such rotation of drum 81 moves damper 8 into open position, and slides damper 37 into closed position. When such opening movement of the damper 8 begins, the limit switch LS2 (which had been held open by the damper 8 in open position) recloses. The operation of the motor 80 continues until the damper 8 reaches fully opened position, at which time it opens the limit switch LS3 and de-energizes coil M41, resulting in the arrest of the operation of motor 80 and its associated damper mechanism. While the switch arm R4 is opened simultaneously with the rest of arms R1 to R6, the motor 171 that drives the fan is not immediately de-energized, since it is desirable that the fan shall continue in operation to purge the gas-cleaning apparatus during the interval of time in which the damper 37 is moving into closed position and the damper 8 is moving into open position. In this way free flow of the furnace gases is maintained during the change-over from gas cleaning operation to "stack" operation.

The means for providing such purging operation of the fan 17 comprise a shunt circuit wire 94 that parallels the circuit wire including the switch R4. This shunt circuit wire maintains the coil of magnetic switch M3 energized after the switch R4 has been opened. The shunt circuit wire 94 includes a limit switch LS1 that is arranged to be opened by damper 8 as it enters fully opened position, at which time the coil of magnetic switch M3 is de-energized, interrupting the energizing circuit of motor 171 and arresting the operation of the fan.

The operation of the gas-cleaning apparatus under the various conditions met in the field will be understood by a consideration of following examples: First, let it be assumed that each of two 250-ton open hearths is equipped with the apparatus, and that one is fired with natural gas and air alone and equipped with checkers or waste heat boilers which reduce the temperatures of the stack gases to between 600° F. and 700° F., and the other is fired with tar and air alone, and that the products of combustion enter the stack around 1200° F. to 1300° F. Reduced to standard conditions the volumes of the products of combustion from the two furnaces will differ somewhat, but this variation may be ignored. The approximate temperatures, volumes, and composition of the products of combustion entering the apparatus from each of these furnaces will be about as follows:

| Furnace | Temperature of gases | Analsysis of Gases— | | | Cu. ft. of Gases handled by Gas-cleaning apparatus | | Volume of Gases at 60° F. |
|---|---|---|---|---|---|---|---|
| | | Percent $N_2$ | Percent $CO_2$ | Percent $H_2O$ | Gases entering | leaving | |
| 1 | °F 650 | 76 | 8 | 16 | cu. ft. 59,000 | cu. ft. 36,000 | 28,000 |
| 2 | 1,250 | 79 | 11 | 10 | 92,000 | 36,000 | 28,000 |

NOTE: With coke oven gas as fuel the $CO_2$ will be around 6% and the water vapor about 23%.

While this table shows a great variation in the volumes of the gases, it is to be borne in mind the mass or weight remains constant in each case and is nearly the same for each furnace; that is, close to 2100 lbs. per minute, so that the quantity of heat involved as well as the volume is directly proportional to the temperature above 212° F.

As these gases pass through the gas-to-gas heat exchanger, those from furnace 1 will be cooled to approximately 450° F. raising the temperature of the clean gases flowing to the stack to above 300° F., while the gases from the second furnace will be cooled close to 850° F. and the clean gases flowing to the stack will be heated to above 700° F. When the 450° F. gases pass through the cooler they are cooled both directly and indirectly and they may be cooled to a temperature below 212° F. If so, they will not be cooled appreciably in the humidifier, and nearly all of the 200 lbs. of water flowing over the splash plates in this section will reach the sloping floor of the apparatus where it will flow toward the hot end to be completely vaporized by the incoming hot gases, cooling them about 340° F., by absorbing about 200,000 B. t. u. per minute. Evidently some of this water will reach the heat exchanger and lower the temperature say from 650° F. to 550° F. This will have the effect of lowering the temperature of the gases to the stack to about 250° F. and the temperature of the dirty gas to about 375° F. When these gases ladened with water vapor reach the cooler, they will have a temperature close to 160° F., but will not be cooled below this temperature, because at such a temperature, the tubes and the gases will be at about the same temperature, and the rate of heat transfer will be very low, if, indeed, there is any.

When the 850° F. gases reach the cooler the rate of heat transfer is rapid, and a large quantity of water is evaporated from the tubes. Nevertheless, the gases may leave the cooler with their temperature reduced, say only to 500° F. In this case the gases will vaporize all of the 200 lbs. of water flowing into the humidifier, absorbing about 200,000 B. t. u. which is sufficient to lower the temperature of the gas to about 160° F.

Thus, the apparatus automatically brings the temperature of the gases down almost to a constant level somewhat below 200° F. and ladens the 36,000 C. F. M. of gases with about 10,800 cu. ft. of steam per minute, increasing the moisture in the hot gases from No. 1 furnace to about 31%, and in the gases from No. 2 furnace to about 35%, in the cold gases, and the partial pressure of the water in the gases to about 236 mm. of mercury and 266 mm. of mercury, respectively.

At these partial pressures, the gases from the No. 2 furnace will be saturated with moisture at 159° F., and the gases from No. 1 furnace at 160° F. The first is but slightly above the temperature at which a fog will form, while the second is already in the fog-forming range.

In reaching the sonic agglomerator, the gases are mixed with the cold air from the siren, which lowers the temperature of the mixture to 143° F., assuming that the air used is about 20% of the volume of gases and enters at 70° F. This air also lowers the percentages of moisture to about 27% and the partial pressure of the water vapor in the mixture to about 210 mm. of mercury for No. 2 furnace, and 30% and 218 mm. of mercury for No. 1 furnace, raising the saturation temperatures to 153° F. and 157° F., respectively. With the temperature of the mixture at 143° F., the saturation pressure is 163 mm. of mercury, which corresponds to 21.4% moisture, so that about 27% of the moisture in the gases from No. 1 furnace, or nearly 80 lbs. (11 grains per cu. ft.) is condensed to fog, and about 20%, or 60 lbs. (8 grains per cu. ft.) in the gases from No. 2 furnace. This fog is more than twice the weight of all the dust in the gas, but the excess fog is entrained in the gases as a mist which passes through the cyclone separators.

If the siren uses less air, say a quantity equal to only 10% of the volume of the gases, the mixture is cooled only to 151° F. (from 160° F.), but the percentages of moisture are decreased to only about 29% for No. 2 furnace and 32% for No. 1 furnace, corresponding to saturation temperatures of 155° F., and 160° F., respectively. In such case the water added to the hot gases from No. 2 furnace is increased to about 225 lbs. per minute, to assure that sufficient fog will be formed in the resonant chamber.

In addition to the dust, any $SO_3$ in the gas is removed by the water fog.

If it is desired to separate $SO_2$ also, coke-works ammonia may be introduced in proper quantity to the fantail chamber 19 by way of a pipe 190. The ammonia combines with these oxides to form salts that are agglomerated in the resonant chamber and separated with the dust in the cyclone separators.

While in the foregoing specification the sonic agglomerator has been described as operated by a siren-type sound generator 36, it will be understood that other devices than the device 36 may be employed for the generation of the required sound waves. Specifically, a vibrating diaphragm device of known construction may be employed.

In the cleaning of gases that include particles of 10 microns or larger size, the sonic generator might be eliminated, and the cyclone apparatus used alone. In further modification any suitable type of dust separator may be used in lieu of the cyclone apparatus. In fact, in those installations where a sonic generator is required, both the sonic and the cyclone apparatus may be in some instances supplanted by a filter or an electrostatic precipitator.

In view of the fact that the gases discharged by the gas-cleaning apparatus are practically free from smoke and other inclusions, the use of furnace stacks may be eliminated, since the fan 17 may be designed large enough to do the work otherwise performed by the draft created by the gases rising in the stacks. It is possible to deliver the clean gases into the open air at ground level, or slightly above ground level, thus avoiding the relatively great cost of furnace stacks.

In the foregoing specification the apparatus has been described as operating only in those periods when the furnace gases are dirty. The savings in power and water thus realized are substantial and in most cases this will prove very advantageous. However, in installations where initial capital investment is of prime consideration, the apparatus may be designed for continuous operation.

The portions 11, 12 and 13 of the apparatus described form a combination heat-exchanger and humidifier. The exact form of the heat-exchanger is susceptible of wide variation in design, as is also the means for introducing the vapor of a liquid into the gases, in this case the liquid being water. However, it is to be remarked that the humidifier advantageously takes the form of means for evaporating the liquid, whereby the vapor of the liquid is entrained in the gases entering the agglomerator. The fogging of the vapor in the gases entering the agglomerator is more effective in many cases than where the vapor is injected (say by means of high-pressure spray nozzles) in the form of small globules or droplets.

In some cases it may not be necessary to produce a fog in the gases for flocculating or agglomerating the dust. In those cases the temperature of the gases in the agglomerator and separator units may be at a temperature in excess of 212° F., which temperature may be established at desired point by shutting off or regulating the quantity of water delivered by the pipe 34. In any event it will be desirable to keep the temperature of the gases in question below 400° F., to inhibit undue stressing or scaling of the metal walls of the apparatus.

Other modifications will occur to those skilled in the art, without departing from the essence defined in the appended claims.

Notice is hereby given of my application for Letters Patent, Serial No. 265,402, filed January 8, 1952, for Improvements in Apparatus for and Method of Cleaning Gases.

I claim:

1. The method of cleaning dust, aerosols and fumes from the flowing hot gases delivered by a metallurgical furnace which comprises cooling the gases, evaporating a liquid and entraining the vapor thereof in the cooled gases, converting a substantial part of the entrained vapor into fog and a substantial portion of the said fumes into solid particles; agglomerating the dust, aerosol, fume and fog particles without appreciable precipitation in the flowing gases, and then mechanically separating the agglomerated particles from the gases.

2. The method of cleaning dust, aerosols and fumes from the flowing hot gases delivered by a metallurgical furnace which comprises cooling the gases, evaporating a liquid and entraining the vapor thereof in said gases, further cooling the gases and converting a substantial part of the entrained vapor into fog and a substantial portion of the said fumes into solid particles; agglomerating the dust, aerosol, fume and fog particles without appreciable precipitation in the flowing gases, and then mechanically separating the agglomerated particles from the gases.

3. The method of cleaning dust from hot gases which comprises passing the gases through a heat-exchanger and thereby cooling them, agglomerating the dust particles in the cooled gases, separating the agglomerated particles from the cooled gases, and circulating the cooled and cleaned gases through said heat-exchanger to serve as the cooling medium for said hot gases.

4. The method of cleaning dust from the hot gases of a metallurgical furnace flowing to a stack, comprising passing the gases through a plurality of stages of heat-exchangers and thereby cooling the gases, agglomerating the dust particles in the cooled gases, separating the agglomerated particles from the cooled gases, and circulating the cooled and cleaned gases through at least one of said stages to serve as a cooling medium for said hot gases, and raising the temperature of said cleaned gases to augment the draft of said stack.

5. Apparatus for cleaning hot dust-laden gases, said apparatus comprising in combination a heat-exchanger having passages with heat-conducting walls for the flow of a cooling medium and arranged for the flow of the hot gases externally over the walls of said passages, a humidifier on the down-stream side of said heat-exchanger for entraining the vapor of a liquid in a stream of said gases flowing through said heat-exchanger, an agglomerator for accumulating the dust particles in the gases flowing from said humidifier into floccules of enlarged size, a separator for removing the enlarged particles from the gases flowing from said agglomerator, and a duct for leading the clean gases from said separator to the heat-exchanger to provide said cooling medium for the heat-exchanger and to effect the heating of said clean gases.

6. Apparatus for cleaning hot dust-laden gases, said apparatus comprising in combination a heat-exchanger having passages with heat-conducting walls for the flow of a cooling medium and arranged for the flow of the hot gases externally over the walls of said passages, a humidifier for entraining the vapor of a liquid in a stream of said gases flowing through said heat-exchanger, means for fogging a substantial part of the vapor in said gases flowing from said humidifier, means for agglomerating the dust and fog particles in the gases into floccules of enlarged size, a separator for removing the enlarged particles from the gases flowing from said agglomerator, and a duct for leading the clean gases from said separator to the heat-exchanger to provide said cooling medium therefor.

7. In combination with a duct or flue for a stream of gases that sometimes contain dust, a structure including a passage for by-passing the gases from said duct, a damper controlling the flow of gas through said passage, a humidifier for entraining the vapor of a liquid in the stream of gases by-passed from said duct, means for fogging a substantial portion of the vapor entrained in said gases flowing from said humidifier, means for agglomerating the fog and dust particles in the gases into floccules of enlarged size, means for removing the enlarged particles from the gases flowing from said agglomerating means, mechanism for opening and closing said damper, and control means for said mechanism comprising a photo-electric unit effective to open said damper when the dust in said gases increases to a density above a predetermined limit and alternately to close said damper when the dust in said gases decreases to a density below said limit.

8. In combination with the flue for the hot dust-laden gases of a metallurgical furnace, apparatus including a passage for by-passing the gases from said flue, a damper controlling the flow of gas through said passage, a heat-exchanger for cooling the by-passed gases, means for introducing water vapor to the by-passed gases, means for agglomerating the fog and dust particles in the gases into floccules of enlarged size, means for separating the enlarged particles from the gases flowing from said agglomerating means, a motor-driven fan for propelling by-passed gases through said apparatus, mechanism for opening and closing said damper, and control means comprising a photo-electric unit effective to open said damper to provide said by-passing of the gases and to start said fan when the dust in said gases increases to a density above a predetermined limit and alternately to close said damper and arrest the operation of said fan when the dust in said gases decreases to a density below said limit.

9. The structure of claim 8, together with a duct for leading the clean gases from said separating means to said heat-exchanger to serve as a gas-cooling medium therein.

10. The structure of claim 8, together with means for applying the clean gases at superatmospheric temperature to the walls of said agglomerating means.

11. The structure of claim 8, together with means for applying the clean gases at superatmospheric temperature to the walls of said agglomerating means and said separating means.

12. In combination with a metallurgical furnace in whose operation dust-laden gases are produced, a flue system for leading such gases from the furnace to a stack, apparatus connected with said flue system for cleaning the gases, a damper for selectively controlling flow of the gases to said stack and said apparatus, said apparatus including means for introducing a liquid into the gases and electrically-driven means for powerfully propelling the gases through the apparatus, mechanism for operating said damper, electrical controls for initiating and interrupting operation of said mechanism and said gas-cleaning apparatus in synchronism, and photo-electric means arranged to operate said electric control means for automatically interrupting the operation of said gas-cleaning apparatus when the gases flowing from said furnace are clean and for automatically initiating operation of said apparatus when the gases flowing from said furnace are contaminated with dust.

13. The method of cleaning dust from the hot gases flowing from a metallurgical furnace which comprises cooling and reducing the volume of the gases, evaporating a liquid and entraining the vapor thereof in such gases of reduced volume, further cooling the gases and converting a substantial part of the entrained vapor into fog particles which, with the dust particles, greatly increase the concentration of the particles in the gases, subjecting such gases to sonic vibration and thereby effecting an agglomeration of the dust and fog particles in the flowing gases, and then separating the agglomerated particles from the gases.

14. The method of cleaning dust from the hot gases flowing from a metallurgical furnace which comprises cooling and reducing the volume of the gases, evaporating a liquid and entraining the vapor thereof in such gases of reduced volume, further cooling the gases and converting a substantial part of the entrained vapor into fog particles which, with the dust particles, greatly increase the concentration of the particles in the gases, subjecting such gases to sonic vibration and thereby effecting agglomeration of the dust and fog particles without appreciable precipitation in the flowing gases, and then separating the agglomerated particles from the gases.

15. The method of cleaning dust from the hot gases flowing from a metallurgical furnace which comprises cooling and reducing the volume of the gases, evaporating a liquid and entraining the vapor thereof in such gases of reduced volume and thereby further cooling the gases, and thereafter still further cooling the gases and converting a substantial part of the entrained vapor into fog particles which, with the dust particles, greatly increase the concentration of the particles in the gases, subjecting such gases to sonic vibration and thereby effecting agglomeration of the dust and fog particles in the flowing gases, and then separating the agglomerated particles from the gases.

16. The method of cleaning dust from the hot gases flowing from a metallurgical furnace which comprises cooling and reducing the volume of the gases, evaporating a liquid and entraining the vapor thereof in such gases of reduced volume, further cooling the gases and converting a substantial part of the entrained vapor into a substantially non-precipitating fog in the flowing gases, whereby the fog particles together with the dust particles greatly increase the concentration of the particles in the gases, subjecting such gases to sonic vibration and thereby effecting an agglomeration of the dust and fog particles in the flowing gases, and then separating the agglomerated particles from the gases.

17. The method of cleaning dust from hot gases which comprises passing the gases through a heat exchanger, and thereby cooling and reducing the volume of the gases, with a substantial increase in the concentration of the dust particles therein, then introducing additional particles in the gases to increase further the particle concentration in the gases, agglomerating the particles in the cooled gases, separating the agglomerated particles from the cooled gases, and circulating the cooled and cleaned gases through said heat-exchanger to serve as the cooling medium for said hot gases.

CHARLES B. FRANCIS.

REFERENCES CITED

The following references are of record in the file of this patent:

UNITED STATES PATENTS

| Number | Name | Date |
| --- | --- | --- |
| 291,264 | Addie et al. | Jan. 1, 1884 |
| 1,130,214 | Steere | Mar. 2, 1915 |
| 1,329,818 | Wolcott | Feb. 3, 1920 |
| 1,782,590 | Wietzel et al. | Nov. 25, 1930 |
| 2,300,761 | Amy | Nov. 3, 1942 |
| 2,307,292 | Palmer | Jan. 5, 1943 |

FOREIGN PATENTS

| Number | Country | Date |
| --- | --- | --- |
| 460,795 | Great Britain | Feb. 4, 1937 |